March 7, 1967     L. L. COFRAN     3,307,242

SEGMENTAL SAW TOOTH CLAMP

Filed July 17, 1964

INVENTOR.
LOUIS L. COFRAN

BY
*H. W. Brownell*
ATTORNEY

3,307,242
SEGMENTAL SAW TOOTH CLAMP
Louis L. Cofran, Youngstown, N.Y., assignor to The Carborundum Company, Niagara Falls, N.Y., a corporation of Delaware
Filed July 17, 1964, Ser. No. 383,458
5 Claims. (Cl. 29—105)

This invention relates to improvements in segmental saws, and more particularly to a new and improved clamp for securing a cutting tooth in a blade of a segmental saw.

Segmental saws of either the reciprocating or rotating type have been used for many years in cutting stone, and because of the improvements brought about by the present invention, such saws are now capable of cutting metal effectively and efficiently.

Typically, segmental saws are composed of a steel blade or center having a series of dovetail sockets, spaced along its cutting edge, and a series of cutting teeth inserted in such sockets, the teeth preferably being formed of resin or shellac bonded silicon carbide or alluminum oxide, or mixtures thereof. The cutting teeth are provided with enlarged dovetail base portions and V-bevels along their inner edges and front and rear side edges, with the latter fitting within V-grooves formed in the front and rear side walls of the sockets, which are also provided with inner walls of V-bevel cross-section and connected to the side walls by enlarged arcuate stress relieving recesses presenting flat walls. The inner edges of the teeth base portions face the respective inner edges of the sockets and are inclined longitudinally toward the rear end thereof, i.e. opposite to the direction of the cut, either translation or rotation, and the rear or back up side walls of the sockets are longer than the front or leading side walls for increased leverage to resist the turning moment, produced by engagement between the leading cutting edge of the tooth and the work. The teeth are provided with side clearance, i.e. taper from a thicker outer edge to a thinner inner edge, and they also may be provided with back relief, i.e. taper from a thicker leading edge to a thinner trailing edge, to facilitate the cutting operation and removal of debris, all as described in U.S. Patent 1,894,087.

As also disclosed in such patent, each cutting tooth is normally secured in position by a plate-like wedge having outer and inner edges of V-groove cross-section, with its outer edge being inclined longitudinally with and engaging the inner V-bevel edge of the tooth and its inner edge engaging the inner V-bevel edge of the socket. These wedge plates are driven toward the rear side walls of the sockets in order to secure the teeth in place by urging their dovetail base portions outwardly in the dovetail sockets.

By reason of the fact that these wedge plates are severally of one piece construction, their V-grooves are necessarily fixed in size, and thus no positive transverse clamping action occurs between the walls forming the V-grooves and the V-bevels on either the inner edges of the teeth or the inner walls of the sockets. As a result, the only positive action between the wedge plates and the teeth and sockets is the wedging compression in the common planes of these members caused by driving the wedges. Thus, if not driven tight enough, the wedges tend to become loose, resulting in eventual loss of or damage to the teeth or the wedges. On the other hand, if the wedges are driven too tightly, the teeth are likely to crack.

Moreover, since the wedges must be able to reciprocate in the sockets, they necessarily are shorter than both the inner edges of the teeth and the inner walls of the sockets, in fact no more than half as long as the latter, in order to permit ready insertion and removal of the wedges, as well as the desired interengagement along the central portions of the inner teeth edges and the inner socket walls. Thus the length of such interengagement can be no more than one half the length of such inner edges and walls. The resulting disadvantage of this necessarily short wedge construction is that the turning moments applied by the work to the leading or cutting edges of the teeth repeatedly tend to cock or rotate the teeth away from the direction of cut, in a type of hammering action, causing the wedges to work loose, with eventual loss of or damage to the wedges or the teeth. This condition is particularly severe when cutting metal, especially with a rotary type saw.

Accordingly, it is a primary object of the present invention to provide a new and improved clamp, which is adapted not only to secure the cutting tooth in its socket, but also to effectively prevent loss of or damage to either the tooth or the socket, and thereby permit a segmental saw to cut metal effectively and efficiently.

Another object is to provide such a clamp which is adapted to produce a positive transverse clamping action against the inner edge of the tooth and the inner wall of the socket, as well as the compressive wedging action in the planes of these members, thereby avoiding driving of a wedge and its attendant disadvantages.

Another object is to provide such a clamp which is adapted to supportingly engage the inner edge of the base portion of the tooth along substantially its entire length and thereby effectively prevent such cocking or rotation of the tooth.

Another object is to provide such a clamp which also is adapted to engage the inner wall of the socket along substantially its entire length to ensure against such cocking or rotation of the tooth.

Another object is to provide such a clamp which is adapted to remain in the socket, even if loosened, and thereby retain the corresponding tooth in the socket, and which clamp can only be removed by disassembly thereof.

Another object is to provide such a clamp which is adapted to replace the conventional wedge without requiring any modification of the saw blade or sockets therein.

Another object is to provide such a clamp which is adapted for use with either reciprocating or rotating segmental saws.

Another object is to provide such a clamp which is adjustable to facilitate assembly or disassembly for ready insertion into and removal from the saw blade.

Another object is to provide such a clamp which is economical to manufacture, simple in construction and most efficient and effective in operation.

These and other objects and advantages of the present invention will become apparent upon consideration of the following detailed description and accompanying drawings, wherein.

Figure 1:
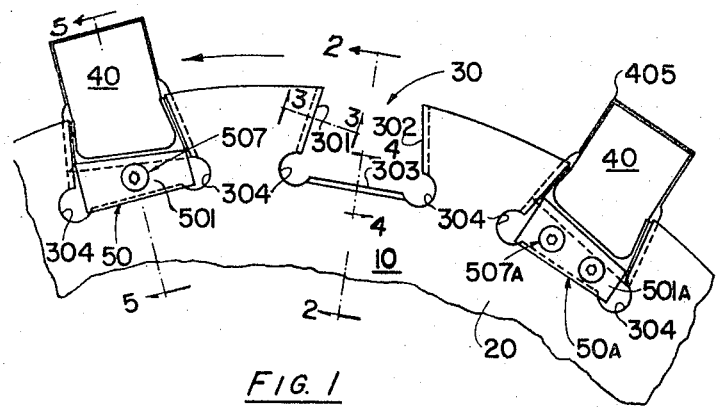
FIG. 1 is a fragmentary side elevational view of a rotating segmental saw incorporating two preferred embodiments of the inventive clamp, the embodiment on the left having one fastening means, and the embodiment on the right having more than one fastening means.

Referring to the drawing, and particularly FIG. 1, a typical rotary segmental saw or wheel is generally indicated at 10 and includes a circular blade or center 20 provided with a series of sockets 30 in which the cutting teeth 40 are inserted and secured in place by the inventive clamp, two preferred embodiments of which are generally indicated at 50 and 50a.

The circular blade or center 20 is preferably made of alloy saw steel or equivalent and is provided with a central arbor hole (not shown) for mounting on a drive shaft (not shown). The blade 10 may be of any suitable diameter, typically 24 inches, and thickness, typically 9/32 inch, and may be provided with any desired number of sockets 30, typically 21 sockets, which are arranged in and equally spaced circumferentially around its outer peripheral cutting edge.

Each socket 30 is undercut to a preferably dovetail shape and includes a front side wall 301, a rear side wall 302 (front and rear being determined relative to the direction of saw rotation as indicated by the arrow in FIG. 1), an inner or bottom wall 303, and recessed walls 304 connecting the side and inner walls.

Figure 2:
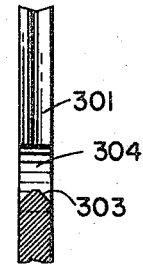
FIG. 2 is a enlarged fragmentary section taken on line 2—2, through the center of the open socket in the saw blade, of FIG. 1.
Figure 3:
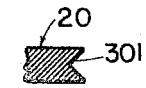
FIG. 3 is an enlarged fragmentary section taken on line 3—3 through the front side wall of the open socket of FIG. 1.
Figure 4:
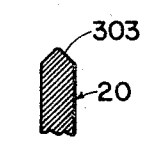
FIG. 4 is an enlarged fragmentary section taken on line 4—4 through the inner wall of the open socket of FIG. 1.

As also seen in FIGS. 2–4, the front side wall 301 and rear side wall 302 are recessed, preferably in the form of V-grooves, while the inner or bottom wall 303 is salient, preferably in the form of a V-bevel. The recessed connecting walls 304 are preferably made concave and flat, not only to facilitate machining of walls 301, 302, and 303, but also for stress relief of blade 20.

Figures 5, 6:
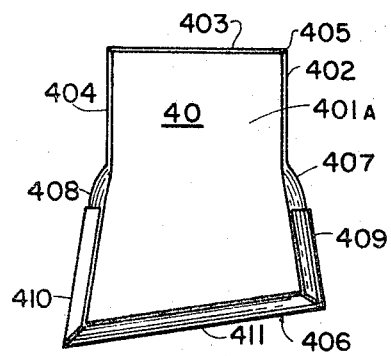
FIG. 5 is an enlarged fragmentary section taken on line 5—5 through the center of the left tooth socket and clamp embodiment of FIG. 1.
FIG. 6 is an enlarged side elevational view of a cutting tooth insertable in the segmental saw of FIG. 1.
Figures 7, 8:
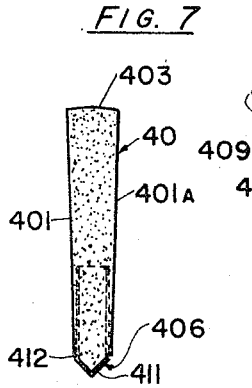
FIG. 7 is an enlarged side elevational view of the opposite side of the tooth of FIG. 6.
FIG. 8 is a section taken on line 8—8 of FIG. 6.

Turning now to FIGS. 6–9, the typical cutting tooth 40 is preferably molded to shape and is composed preferably of resin or shellac bonded silicon carbide grains or aluminum oxide grains or mixtures thereof. The upper or cutting portion of tooth 40 is preferably rectangular in side elevation and includes generally flat sides 401, 401a, terminating at the end in a front or leading face 402, an outer or upper trailing face 403, and a rear face 404. These faces are considerably narrower than the sides and are also slightly crowned as a result of the molding operation. The juncture of leading face 402 and trailing face 403 constitutes the cutting edge 405 of tooth 40, as best seen in FIGS. 6 and 7, and this cutting edge is foremost as the saw 20 rotates in the direction of the arrow in FIG. 1.

Continuing with FIGS. 6–9, the upper or cutting portion of tooth 40 merges with an enlarged lower or base portion which is inserted into the corresponding socket 30, and like socket 30, is undercut to a preferably dovetail shape. This base portion is preferably protected by a metallic sheath 406 extending downwardly from front and rear shoulders 407, 408 and over the front, rear and lower or inner edges of the base portion. Sheath 406 is preferably made from suitable gauge hot rolled steel and becomes an integral part of tooth 40 during molding thereof. Thus, the sheath 406 forms the edges of the base portion of the tooth, namely front edge 409, rear edge 410, and bottom or inner edge 411, each of which is salient and preferably of double or V-beveled cross-section. The front and rear edges 409, 410 conform to and are received in the V-grooves of front and rear side walls 301, 302 of socket 30, while inner edge 411 faces and is inclined rearwardly toward inner socket wall 303, as best seen in FIG. 1.

Returning to FIGS. 6–9, it will be seen that the near side (FIGS. 1 and 6) of sheath 406 is provided with a generally U-shaped retaining wall portion 412, whereas the far side (FIG. 7) has no such portion, and that during molding of the tooth, the sheath is slightly recessed within side walls 401, 401a, which are of slightly different contour because of retaining wall portion 412. As also seen in FIG. 8, sheath 406 is slightly recessed below side walls 401, 401a, which preferably taper or converge downwardly toward each other to provide the desired side clearance. If desired, tooth 40 could also be provided with back relief by tapering sides 401, 401a rearwardly as well, although no such back relief appears in the illustrated embodiment, since sides 401 401a are shown in FIG. 9 as being substantially parallel.

The blade, socket and tooth structure so far described is conventional, but it provides the environment for and a new and improved combination with the inventive clamp now to be described. Referring to FIG. 1, two preferred embodiments are generally indicated at 50 and 50a, as noted above. The only difference between the illustrated embodiments is that left embodiment 50 has only one central fastening means, while right embodiment 50a has two longitudinally spaced fastening means. Thus, a detailed description of embodiment 50 will suffice for both.

Figures 9, 10, 11, 12:
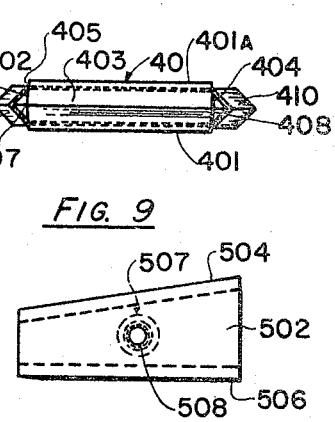
FIG. 9 is a top plan view of the tooth of FIG. 6.
FIG. 10 is an enlarged side elevational view of the inventive clamp embodiment on the left in FIG. 1.
FIG. 11 is an enlarged side elevational view of the opposite side of clamp of FIG. 10.
FIG. 12 is a section taken on line 12—12 of FIG. 10.

Referring to FIGS. 10–12, inventive clamp 50 is composed preferably of a pair of elongated metal, and preferably steel, wedge plates 501, 502, or laterally diminishing and preferably generally trapezoidal cross section, these plates having their narrower sides facing each other and opposed pairs of recessed and preferably beveled longitudinal edges. The upper or outer pair of edges 503, 504 are inclined longitudinally of the plates, while the inner or lower pair of edges 505, 506 are not.

The means for fastening plates 501 and 502 together may be of any suitable type including rivets, but is preferably adjustable and in the form of a machine screw 507, having an externally threaded shank 508 and a "flat" (i.e. frusto-conical) head 509 provided with a hexagonal tool receiving recess 510. To accommodate screw 507, plate 501 is provided with a countersunk central through bore 511 for receiving head 509, and plate 502 is provided with an internally threaded central through bore 512 for receiving and engaging shank 508.

The alternative preferred embodiment 50a of FIG. 1 is identical to the just described embodiment 50, except that two longitudinally spacer screws 507a are provided, and plates 501a and 502a (not shown) are each provided with a pair of accommodating bores (not shown) instead of one. While embodiment 50 is preferred from the standpoint of cost and simplicity, embodiment 50a provides two means, instead of one, for applying lateral compression and obtaining more secure engagement with socket 30 and the base portion of tooth 40, as will be described in greater detail below.

Returning to embodiment 50, as best seen in FIGS. 1 and 5, plates 501 and 502 also are arranged in the corresponding socket 30, with their narrower sides facing each other, their upper or outer beveled edges 503, 504, inclined rearwardly with and engaging the inner edge 411 of sheath 406 of the corresponding tooth base portion, and their bottom or inner edges 505, 506 engaging the corresponding socket inner wall 303. Screw 507, which is adjustable for moving plates 501 and 502 toward each other, securely fastens these plates together, upon tightening. Thus, clamp 50 not only produces a positive wedging action in urging tooth 40 outwardly in its socket, but also a positive lateral or transverse compressive clamping action against inner tooth edge 411 and inner socket wall 303. Visualizing the forces applied by clamp 50 in FIG. 5, it becomes readily apparent that the wedging action is produced by the vertical components applied to edge 411 and wall 303, while the transverse clamping action is provided by the horizontal components applied to such edge and wall, and these components are substantially equal, because plates edges 503–506 are preferably beveled at 45 degrees, while edge 411 and wall 303 are preferably double or V-beveled at 90 degrees.

One important advantage of this construction is that the need for driving conventional wedges is eliminated, as are their attendant disadvantages. Another important advantage is that plates 501 and 502 can be and are made longer than the conventional wedges. Thus, outer beveled edges 503, 504 engage inner tooth edge 411 along substantially its entire length, and preferably its entire length between its front and rear edges 409 and 410 as shown in FIG. 1, and inner beveled edges 505, 506 engage inner socket wall 303 substantially along its entire length, and preferably its entire length, as shown. The inherent result is that cocking or rotation of the teeth in their sockets is eliminated.

Even if the inventive clamp is loosened, it will remain in the socket, and so will the corresponding tooth 40. While either embodiment 50 and 50a must be disassembled for removal of the corresponding tooth, screw 507 or screws 507a facilitate assembly or disassembly for ready insertion into or removal from saw blade 20.

It will also be noted from FIG. 5, that when secured, the inventive clamp is preferably no wider than the width of the tooth base portion or of center 20 to avoid any interference with the work in making deep cuts. While the preferred direction of cut is shown by the arrow in FIG. 1, the inventive clamp also will perform quite satisfactorily should the direction of cut be reversed without reversing the teeth because of the aforedescribed transverse clamping action and increased clamp length preventing removal thereof except by disassembly.

It will now be seen how the invention accomplishes its various objects, and the numerous advantages of the invention likewise will be evident. While the invention has been described and illustrated herein in detail by reference to certain preferred embodiments, it is to be understood that these embodiments are illustrative rather than limiting, and that the scope of the invention is to be determined by the appended claims.

I claim:

1. In a segmental saw including a blade provided with a socket arranged in its peripheral edge and having a salient inner wall and a pair of recessed side walls, a cutting tooth inserted in said socket and having a salient inner edge facing said inner wall and a pair of salient side edges received in said side walls, the combination therewith of a clamping means for securing said tooth in said sockets and urging said tooth against said side walls comprising a pair of elongated plates of laterally diminishing cross sections and having their narrower sides facing each other, an outer pair of recessed edges engaging said inner edge of said cutting tooth and an inner pair of recessed edges engaging said inner wall of said socket, said outer pair of recessed edges engaging said inner edge substantially along its entire length, said inner pair of recessed edges engaging said inner wall substantially along its entire length, and means for fastening said plates together.

2. In a segmental saw including a blade provided with a dovetail socket arranged in its peripheral edge and having V-grooved side walls and a V-beveled inner wall, a cutting tooth provided with a dovetail base portion inserted in said socket and having V-beveled side edges received in said side walls and a V-beveled inner edge facing said inner wall, the combination therewith of a clamping means for securing said tooth in said socket and urging said tooth against said V-grooved side walls comprising a pair of elongated plates of generally trapezoidal cross section and having their narrower sides facing each other, an outer pair of beveled edges engaging said inner edge of said cutting tooth and an inner pair of beveled edges engaging said inner wall of said socket, said outer pair of beveled edges engaging said inner edge substantially along its entire length, said inner pair of beveled edges engaging said inner wall substantially along its entire length, and means for fastening said plates together.

3. In a segmental saw including a blade provided with a dovetail socket arranged in its peripheral edge and having V-grooved front and rear side walls and a V-beveled inner wall, a cutting tooth provided with a dovetail base portion inserted in said socket and having V-beveled front and rear side edges received in said front and rear side walls respectively, and a V-beveled inner edge inclined rearwardly and facing said inner wall, the combination therewith of a clamping means for securing said cutting tooth in said socket and urging said front and rear side edges against said front and rear walls respectively, comprising a pair of elongated plates of generally trapezoidal cross section and having their narrower sides facing each other, an outer pair of beveled edges engaging said inner edge of said cutting tooth and an inner pair of beveled edges engaging said inner wall of said socket, said outer pair of beveled edges inclined rearwardly and engaging said inner edge substantially along its entire length, said inner pair of beveled edges engaging said inner wall substantially along its entire length, and means for fastening said plates together.

4. In a rotary segmental saw including a circular blade provided with a series of undercut sockets arranged in and spaced circumferentially along its peripheral edge and each having recessed front and rear side walls, a salient inner wall and recessed walls connecting said side and inner walls, a series of cutting teeth provided with undercut base portions severally inserted in said sockets and each having salient front and rear side edges received in the corresponding ones of said front and rear side walls respectively, and a salient inner edge inclined rearwardly and facing its corresponding inner wall, the combination therewith of a series of clamping means for severally securing said base portions in said sockets and urging said front and rear side edges against said front and rear side walls, respectively, each of said clamping means comprising a pair of wedge plates of laterally diminishing cross section and having their narrower sides facing each other, an outer pair of recessed edges inclined rearwardly and engaging the corresponding one of said inner edges and an inner pair of recessed edges engaging the corresponding one of said inner walls, said outer pair of recessed edges engaging said corresponding inner edge along its entire length between the corresponding ones of said front and rear side edges, said inner pair of recessed edges engaging said corresponding inner wall along its entire length, and adjustable means for fastening said plates together.

5. A clamp for securing a cutting tooth in a socket in a segmental saw blade comprising a pair of elongated wedge plates of laterally diminishing cross section and having their narrower sides facing each other, said plates have front and rear edges, respectively, and opposed pairs of recessed longitudinal edges, one of said pairs of edges being inclined downwardly and rearwardly from said front edges and engageable with opposite sides of a base portion of said tooth substantially along its entire length, one of said plates having a countersunk bore, the other of said plates having a threaded bore, a fastening member having a head disposed in said countersunk bore and a threaded shank engageable with said threaded bore for moving said plates toward each other.

References Cited by the Examiner

UNITED STATES PATENTS

| | | | |
|---|---|---|---|
| 959,104 | 5/1910 | Barker | 29—105 |
| 1,458,671 | 6/1923 | Westgard | 143—151 |
| 1,894,087 | 1/1933 | Cowie | 125—22 |
| 1,926,646 | 9/1933 | Leahy | 29—105 |
| 1,978,084 | 10/1934 | Howard | 29—105 X |
| 2,064,304 | 12/1936 | Hall. | |

WILLIAM W. DYER, Jr., *Primary Examiner.*

HARRISON L. HINSON, *Examiner.*